Dec. 1, 1942.  L. J. KOCI  2,303,561
TOASTER AND CONTROL THEREFOR
Filed July 21, 1937  4 Sheets-Sheet 1

Inventor:
Ludvik J. Koci
By Wilson, Powell, McKenna & Wintercorn
Attys.

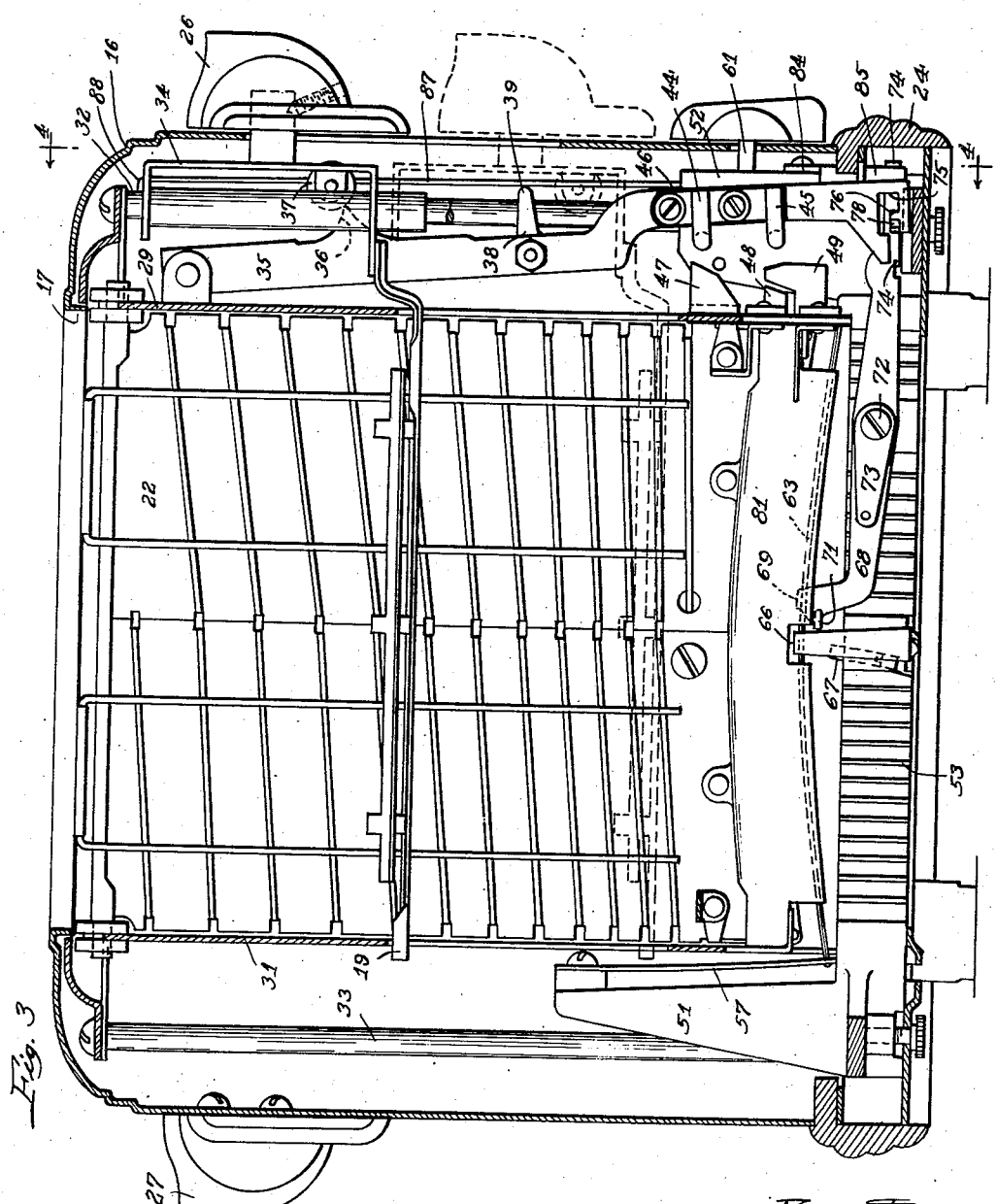

Dec. 1, 1942.　　　　L. J. KOCI　　　　2,303,561
TOASTER AND CONTROL THEREFOR
Filed July 21, 1937　　　　4 Sheets-Sheet 3
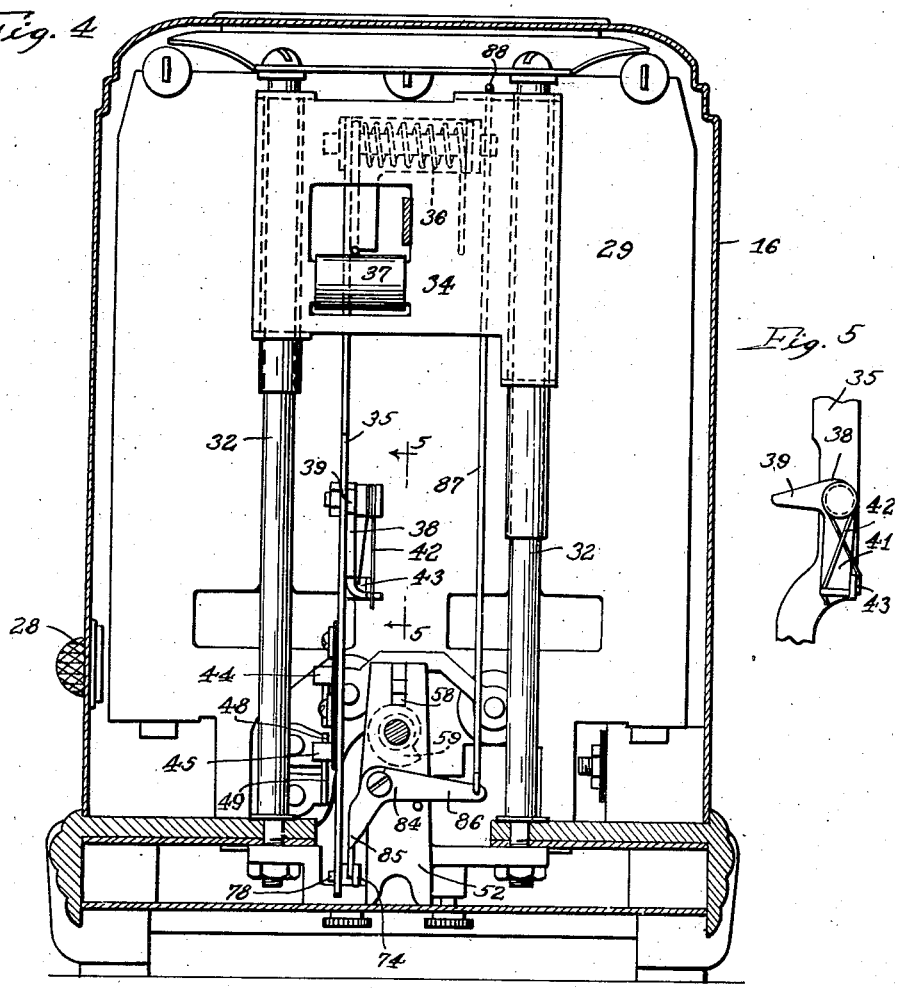
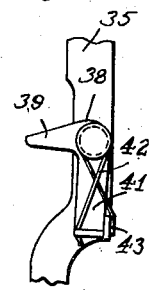
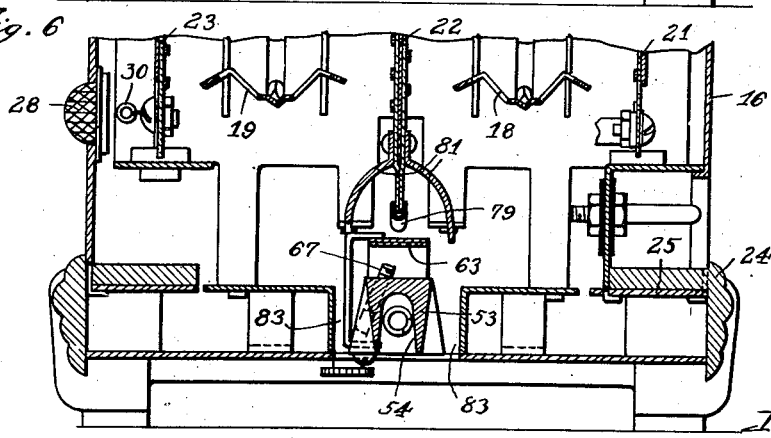
Inventor
Ludvik J. Koci
By
Wilson, Dowell, McCanna & Wintercorn
Attys.

Dec. 1, 1942.                L. J. KOCI                2,303,561
                    TOASTER AND CONTROL THEREFOR
                        Filed July 21, 1937            4 Sheets-Sheet 4
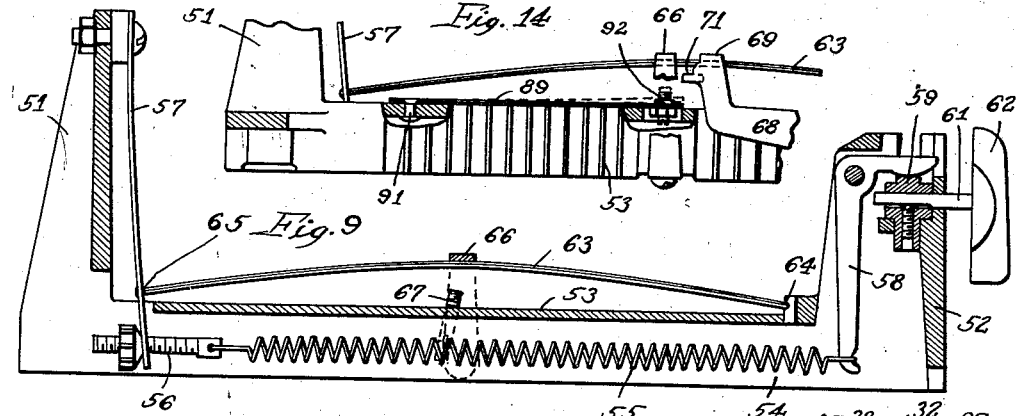
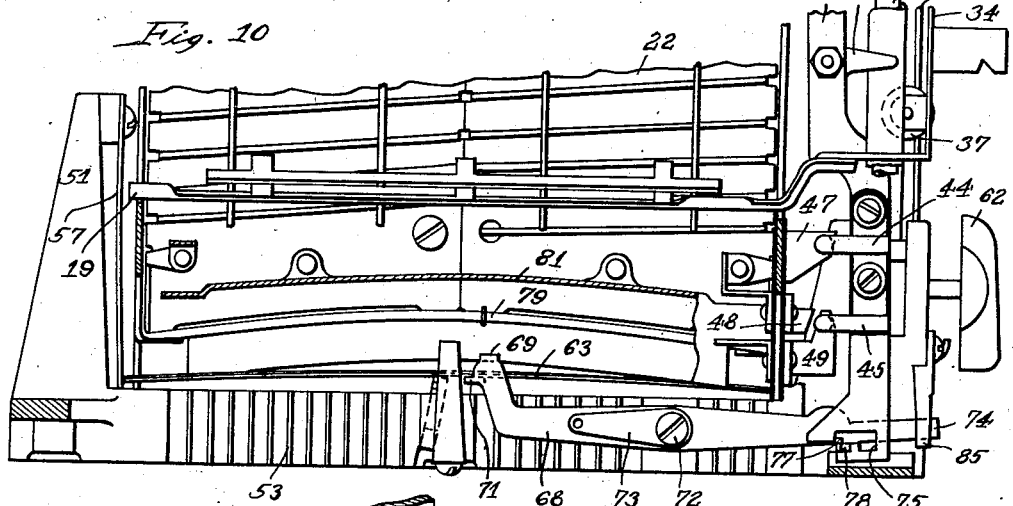
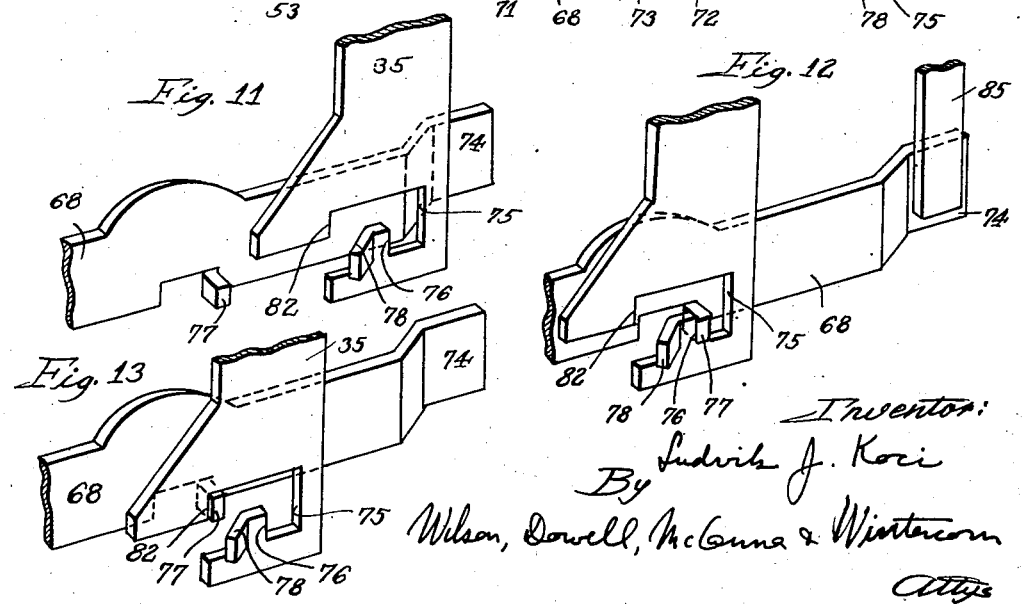

Patented Dec. 1, 1942

2,303,561

UNITED STATES PATENT OFFICE 2,303,561

TOASTER AND CONTROL THEREFOR

Ludvik J. Koci, Chicago, Ill., assignor to Chicago Flexible Shaft Company, Chicago, Ill., a corporation of Illinois Application July 21, 1937, Serial No. 154,759

7 Claims. (Cl. 219—19)

This invention relates to electrical heating devices and more particularly to a toaster or the like having improved means for controlling the toasting operations.

An important object of the invention is the provision of a cooking device having a control mechanism of novel characteristics.

A further object of the invention is the provision of a cooking device having thermally responsive means for terminating the cooking operations, wherein the time required to heat and cool the thermally responsive means one or more times is taken as a measure of the cooking time.

A further object of the invention is the provision of a cooking device having improved switch means and improved means for actuating the switch from a thermally responsive member.

Other objects and advantages will be apparent to those skilled in the art from the following description and the accompanying drawings, in which—

Fig. 3 is a longitudinal section through the toaster;

Fig. 4 is a section on the line 4—4 of Fig. 3;

Fig. 5 is a fragmentary view on the line 5—5 of Fig. 4;

Fig. 6 is a transverse section through the lower part of the toaster;

Fig. 9 is a longitudinal section through the thermostat frame showing the means for varying and adjusting the tension on the bimetal blade;

Fig. 10 is a section similar to Fig. 8 showing the parts in moved position;

Figs. 11, 12 and 13 are fragmentary views of the switch latch mechanism, and

Fig. 14 is a fragmentary view showing a modified form of the invention having secondary thermostat means.

Figure 1:
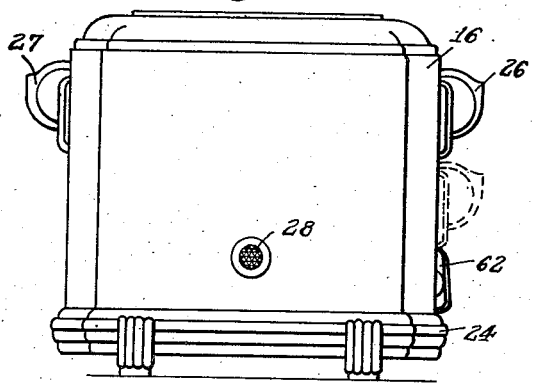
Figures 1 and 2 are side and end views, respectively, of a toaster embodying my invention.
Figure 2:
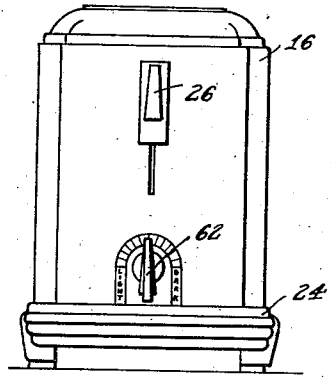

This is a continuation in part of my copending application, Serial No. 39,957, filed September 10, 1935, entitled Toaster and the like. The invention contemplates a toaster of the same general class, and reference is made to said application for more detailed description of the general structure of the toaster. The toaster has a casing designated generally by the numeral 16 provided with spaced slots 17 on its upper side for the insertion of slices of bread to rest on bread carriers 18 and 19 (Fig. 6) between toasting elements 21, 22 and 23. The casing 16 is carried on a base member 24, in this instance of synthetic resin, such as "Bakelite," having a reinforcing plate 25. Handles 26 and 27 are positioned on the ends of the casing, the handle 26 being movable between the full and dotted line positions shown in Fig. 3 for the purpose of inserting and removing the bread, as will presently more fully appear. A lense or similar device 28 is inserted in the side of the casing and serves with a coil 30 to indicate the operative condition of the toasting mechanism. The heating elements 21 to 23, inclusive, are carried on frame members 29 and 31 supported at their lower ends in the plate 25 and at their upper ends by means of a pair of rods at each end of the toaster designated by the numerals 32 and 33 (Fig. 3). The toast racks 18 and 19 are supported on a carrier 34, which in turn is slidably supported on the rods 32, as best shown in Fig. 4 for movement with the handle 26 between the full line and dotted line positions of Fig. 3.

Figure 7:
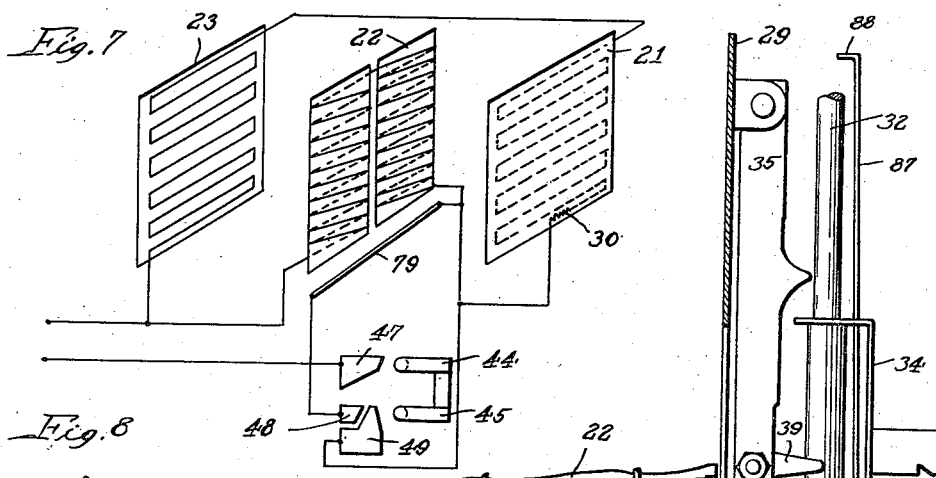
Fig. 7 is a wiring diagram.
Figure 8:
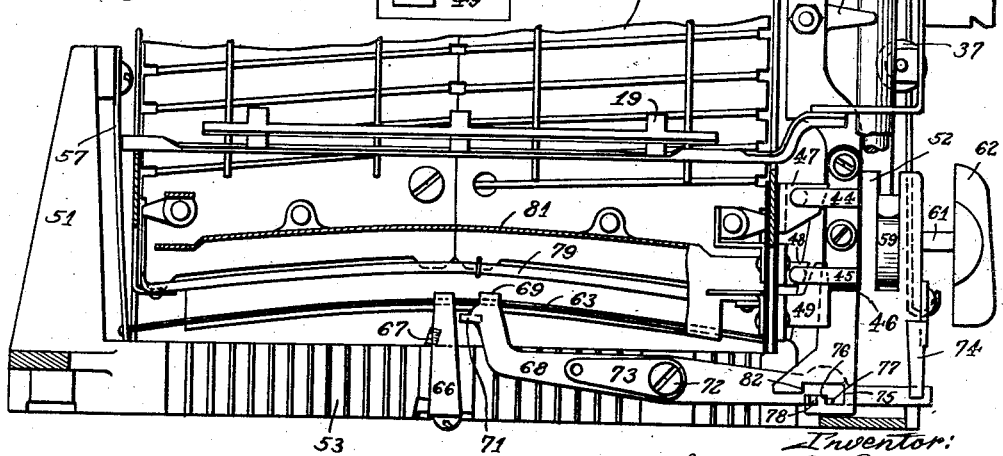
Fig. 8 is a longitudinal section through the lower part of the toaster showing the bread racks and the means for actuating the same, some of the parts being broken away to show the switch mechanism.

Attached to the frame member 28 is a switch lever 35 having a spring 30 arranged to urge the lower end of the lever outwardly away from the plate 29. The lever 35 has a cam surface 36 adapted for engagement by a roller 37 positioned on the carrier 34, the cam and roller normally serving to maintain the carrier and the toast racks in the upper position. A latch member 38 having an outwardly projecting leg 39, and a leg 41 extending longitudinally of the switch lever, is pivotally positioned on the lever, a spring 42 urging the leg 41 against a shoulder 43 of the lever. When the rack 34 is moved downward, the roller 37 engages the upper surface of the leg 39 urging the switch lever into the position shown in Fig. 8. The pawl 38 rotates in a clockwise direction, facing Fig. 5, to permit the carrier 34 to be moved to the upper position without disturbing the position of the switch lever. Spring pressed contacts 44 and 45 are carried on the switch lever 35 near the lower end thereof and are insulated therefrom by insulation 46, the contacts being interconnected as shown in Fig. 7. These contacts are so spaced that the contact 44 engages a segment 47 positioned on the frame member 29 when the switch lever is moved to the position shown in Fig. 8. Likewise, the contact 45 is positioned to engage either a segment 48 when the switch lever occupies its innermost position as shown in Fig. 8, or a segment 49 when the switch lever occupies an intermediate position as shown in Fig. 10.

A thermostat frame member having upstanding end pieces 51 and 52 and an intermediate portion 53 is positioned at the bottom of the toaster below the central toasting element 22, as best shown in Fig. 6. The intermediate portion 53 has a centrally disposed recess 54 within which is positioned a coiled spring 55 attached through a screw 56 to a vertically disposed spring member 57 carried on the upper end of the end piece 51 and one arm of a bell crank lever 58, the opposite arm of the lever 58 bearing against a cam 59 secured to a pin 61 carried in the end piece 52, which pin also carries a hand 62 positioned on the outer surface of the casing 16. A bimetal or similar thermostat metal strip 63 has one end seated in a groove 64 adjacent the end piece 52 and the opposite end thereof seated in a groove 65 in the spring member 57, as best shown in Fig. 9. Through rotation of the hand 62 the tension on the bimetal strip 63 can be varied, thereby varying the temperature at which the strip will snap downward toward the intermediate portion 53. A finger 66 attached to the intermediate portion 53 serves to limit the upward position of the strip 63, whereas a screw 67 serves to limit the lowermost, heated, or secondary position of the blade 63.

Articulated on one side of the intermediate portion 53 is a lever 68 adapted to act as a latch for the switch lever 35. The latch lever 68 has a pair of fingers 69 and 71 projecting inwardly over the intermediate portion 53 on opposite sides of the strip 63 in such manner that the latch lever will be rotated in response to movement of the bimetal strip in either direction between the stops 66 and 67. The latch lever 68 is carried on the intermediate portion 53 through a screw 72, the screw passing loosely through the lever so as to permit of a certain amount of sidewise movement of the lever, and a spring 73 acts between the screw and the lever to normally urge the fingers 69 and 71 inward and the opposed end 74 of the lever outward from the plane of the portion 53, but to permit of lateral movement of the lever. The end 74 of the latch lever 68 cooperates with the lower end of the switch lever 35 in the manner shown in Figs. 11 to 13 to control the movement of the switch lever.

Referring to Figs. 11 to 13, Fig. 11 shows the position of the parts conforming to Fig. 3 with the switch lever 35 occupying its outward position. When the handle 26 is depressed to the dotted line position of Fig. 3, the roller 37 engages the arm 39, moving the switch lever 35 to the position shown in Fig. 8. During this movement, the lower end of the switch lever moves longitudinally of the latch lever 68 into the position shown in Fig. 12. The lower end of the switch lever is notched, as shown at 75, to provide a shoulder 76 behind which a finger 77 on the latch lever is adapted to engage. A cam element 78 serves to move the latch lever 68 laterally upon engaging movement of the switch lever, as will be apparent from Fig. 12. In this position of the switch lever the contact 44 engages the segment 47 and the contact 45 engages the segment 48, as a result of which the electrical circuit through the toasting elements 21, 22 and 23 disclosed, and likewise through a secondary heating element 79 positioned within a shield 81 above the thermostat strip 63. The secondary heating element 79 serves to heat the thermostat strip 63 in proportion to the heat applied to the bread slices by the toasting elements, and when the thermostat strip reaches a predetermined temperature as determined by the position of the pointer 62 and the consequent compression on the thermostat strip, the latter moves, in this particular instance, with a snap action from the position shown in Fig. 8 to the position shown in Fig. 10. During this movement, the strip engages the finger 71 rotating the latch lever 68 in a counterclockwise direction facing Figs. 3, 8 and 10 to 13. This raises the end 74 of the latch lever 68 to a point at which the finger 77 clears the shoulder 76, whereupon the switch lever 35 moves to the position shown in Fig. 10 under the force of the spring 30, the switch lever being stopped in this position by engagement of the finger 77 against a shoulder 82 on the switch lever, as shown in Fig. 13. In this position the contact 44 continues to engage the segment 47, but the contact 45 is moved out of engagement with the segment 48 and into engagement with the segment 49. As will be seen from Fig. 7, this deenergizes the secondary heating element 79, whereupon the thermostatic strip 63 begins to cool under the influence of air passing upward through the toaster and entering through openings 83 in the bottom of the toaster casing. When the thermostat strip has cooled to a certain predetermined lower temperature as determined by the position of the adjustable stop member 67, it snaps back to its original position, as shown in Figs. 8 and 9, during which movement it engages the finger 69 on the latch lever 68, rotating the lever in a clockwise direction, which movement moves the finger 77 downward out of engagement with the shoulder 82 and permits the switch lever 35 to move from the position shown in Fig. 10 back to the position shown in Fig. 3 with the contacts 44 and 45 free of any of the segments, thus opening the switch through the toasting elements and deenergizing the toaster.

In order to permit the toaster to be manually operated, I have provided a bell crank lever 84 having an arm 85 adapted to engage the end 74 of the latch lever 68, the opposite arm 86 of the lever having a rod 87 projecting upward therefrom, the upper end of the rod being bent as shown at 88 so that the carrier 34 will engage the bent upper end 88 at the uppermost position of the carrier and rotate the bell crank lever 84, thereby moving the end 74 of the latch lever 68 laterally so as to release the finger 77 from the shoulder 76 and permit the switch lever 35 to pass directly from the position shown in Figs. 8 and 12 to the position shown in Figs. 3 and 11.

The cycle of operation of the toaster is as follows: Assuming the parts occupy their normal rest position, as shown in Fig. 3, slices of bread are inserted through the openings 17 onto the bread carriers 18 and 19. The handle 26 is then depressed to the dotted line position during which movement the roller 37 engages the latch arm 39, moving the switch lever 35 to the position shown in Fig. 8 with the contact 44 engaging the segment 47 and the contact 45 engaging the segment 48, the switch lever 35 and the latch lever 68 moving into the position shown in Fig. 12. The toasting elements 21, 22 and 23 are thus energized and also the secondary heating element 79. Upon the application of a certain amount of heat to the bread slices and the concurrent heating of the thermostat strip 63, the latter will snap to the position shown in Fig. 10, releasing the finger 77 from the shoulder 76 and permitting the switch lever 35 to move to the position shown in Fig. 13. Simultaneously the contact 45 moves onto the segment 49 and off the segment 48, thus deenergizing the secondary heating element 79. The thermostatic strip then cools and subsequently snaps back to the position shown in Figs. 8 and 9, rotating the latch lever 68 to the position shown in Figs. 3 and 11, thus releasing the finger 77 from the shoulder 82 and permitting the switch lever 35 to return to the position shown in Fig. 3, thus completing the toasting operation. The operator then raises the handle 26 causing the upper ends of the toasted bread slices to project from the top of the casing in a convenient position for their removal. The bread carriers 18 and 19 and handle 26 are held in the upper position by contact of the cam 36 with the roller 37. The toasted bread may be removed and successive slices of bread inserted into the toaster immediately for a successive toasting operation, since the thermostat strip 63 is returned to its initial position.

In order to obtain toast of identical color when toasting in rapid succession and starting with a normally cold toaster, the following toasting periods are successively required in arbitrary time units, with the particular toaster construction herein illustrated: 100, 60, 55, 53, 52, 52, etc.

It will be seen that the total toasting period in any of the successive toasting intervals consists of a thermostat heating period which becomes shorter as the toaster becomes warmer, plus a thermostat cooling period which is approximately constant in duration, irrespective of the toaster temperature, other conditions being equal. The thermostat heating period in this particular toaster construction for successive toasting intervals when the toaster is operated in rapid succession is about as follows in arbitrary time units: 100, 50, 45, 42, 41, 41, etc., the time reaching a minimum at approximately 41. The duration of the cooling period is varied by adjustment of the set screw or stop 67 against which the thermostat strip snaps in its downward movement. For purpose of illustration, we will assume that the stop 67 is adjusted so that the cooling period will be eighteen time units. Therefore, the pointer 62 controlling the tension on the thermostat strip must be set so that the thermostat heating period will be 82 time units in order to obtain a total of 100 time units for the first toasting, assuming the toaster is started from a normal cold condition. With the first thermostat heating period being 82 units, successive thermostat heating periods will be approximately as follows: 82, 41, 37, 35, 34, 34, etc. Thus, the total toasting period for the successive toasting intervals will be as follows: 82 plus 18 equals 100; for the second toasting 41 plus 18 equals 59; for the third, 37 plus 18 equals 55; for the fourth, 35 plus 18 equals 53, and for the fifth, sixth, etc., 34 plus 18 equals 52; which results in successive toasting periods of the desired ratio.

While the thermostat cooling period remains approximately constant during successive toasting intervals when conditions remain the same, some variation is occasioned by fluctuation in the commercial line voltage and by variations in this voltage in different parts of the country. In order to compensate for this variation, I have provided a secondary thermostat strip 89 (Fig. 14) attached to the upper surface of the intermediate portion 53 of the thermostat frame by means of a rivet as shown at 91, the free end of this strip having an adjustable screw 92 adapted to be substituted for the stop member 67, the screw being moved in response to temperature by the secondary thermostat strip 89. When employing this construction it would be desirable to set the remainder of the control to produce proper time intervals at the lower fringe of the commercial voltage range so that increase of voltage in the commercial supply and consequent greater heating effect in the toaster will be compensated for by warpage of the secondary thermostat strip 89 so that with the change in voltage the thermostat cooling periods will remain constant.

While I have thus described and illustrated a specific embodiment of my invention by way of illustration, I am aware that the invention may be embodied in numerous constructions specifically different herefrom but embodying the principles thereof, and I do not wish to be limited except as required by the prior art and the scope of the appended claims, in which I claim:

1. The combination in an electrical cooking device, of heating means for cooking articles in succession to a predetermined degree, thermostat means arranged to be heated proportional to the heating of said articles and adapted to have snap-action movement from an initial position to a secondary position when heated to a predetermined temperature and to have snap-action from said secondary position to said initial position when cooled to a predetermined temperature, secondary heating means for heating said thermostat means, a switch member biased to move from a first position wherein said heating means and said secondary heating means are energized, to a second position wherein only said heating means is energized and to a third position wherein neither heating means is energized, and latch means adapted to latch said switch member successively in said first and second positions, said latch means being responsive to the first mentioned snap-action movement of the thermostat means to release the switch member from said first position and to latch said member in said second position and being responsive to the second mentioned snap-action movement of the thermostat means to release said switch member from second position.

2. The combination in an electrical cooking device of primary heating elements for cooking articles in succession, thermostat means movable between a heating and a cooling position for timing the cooking interval, secondary heating means for heating said thermostat proportional to the heating of said articles, a switch member adapted to move under spring action from a position closing circuit through said primary and secondary heating elements to a position opening circuit through the secondary heating element and thence to a position opening both circuits, a latch lever supported for rotation in opposite directions in response to movement of the thermostat to control the movement of said switch member in steps through said successive positions during each cooking interval to time the cooking intervals, an article supporting rack movable between an elevated and a lowered position for the purpose of inserting and removing articles from the toaster, and means for moving said latch lever laterally in response to a prescribed movement of said article supporting rack for movement of said switch member directly from the last to the first mentioned position thereof to manually terminate the toasting interval.

3. The combination in an electrical cooking device of heating elements for cooking articles in succession, and thermo-responsive timing means for controlling the heating elements to produce uniform cooking results through successive cooking intervals comprising a thermostat strip arranged to move with a snap action from a heating position to a cooling position at a predetermined temperature, and to return to the heating position at a lower temperature, stop means positioned to limit the return movement of said strip in the cooling position at a point to produce a substantially uniform cooling time through successive cooking intervals, thermostat means for adjusting the position of said stop means to compensate for variations in the electric power supply to said cooking device, and means responsive to said return movement for terminating the cooking intervals.

4. The combination in an electrical cooking device of heating elements for cooking articles in succession, a thermostat element arranged to be heated proportional to the heating of said articles, means for stressing said element to move with a snap action from a heating position to a cooling position upon the lapse of a heating time varying with successive cooking intervals dependent upon the ambient temperature of the cooking device, means for cooling said element to return the same to the heating position, means responsive to said return movement for terminating the cooking operation, stop means for predetermining the cooling position of said element to provide a substantially constant cooling period during successive cooking intervals, said stress means and said stop means being proportioned so that the sum of the cooling time and the heating time varies at successive cooking intervals in a predetermined decreasing rate as the cooking device rises in temperature due to successive cooking operations.

5. In a timer, thermally responsive means adapted to build up energy which is utilized for instantaneous release in a snap-action movement when heated at a predetermined high temperature and to subsequently act in a snap-action movement in the opposite direction when cooled to a predetermined low temperature, said thermally responsive means including a member operated in said snap-action movements, stop abutments at opposite sides of said member to limit the snap-action movement thereof, controllable means adapted to be actuated by each said snap-action movements, and a second thermally responsive means for actuating one of said stop abutments.

6. A timer as set forth in claim 5, in which the snap-action member of the thermally responsive means is a bi-metallic member, and means for quickly cooling said thermostat member after its snap-action movement as a result of heating, the second thermally responsive member being responsive to the temperature of said quick-cooling means.

7. An electrical device including a primary heater and a thermal timer for controlling the heater in successive predetermined intervals, said thermal timer including a second heater, a bi-metallic thermostat strip responsive to the second heater and stressed to build up energy in an initial movement in one direction when heating and to have snap action in said direction beyond said movement and to build up energy in an initial movement in the opposite direction when cooling and to have snap action in said opposite direction beyond said movement when cooling, a circuit for said heaters, means for opening and closing the circuit including a switch and movable switch operating means biased to a switch open position and movable to a first closed position in which both heaters are energized and to a second closed position in which only the second heater is de-energized, and further movable to said switch open position, latch means for retaining the switch operating means in the first and second switch closed positions, respectively, and means actuated by impact of the thermostat strip in its said snap action movement after heating to thereby release the latch means from said first retaining position and actuated by impact of the thermostat strip in its said opposite snap action movement after cooling to thereby release the latch means from said second retaining position.

LUDVIK J. KOCI.